Jan. 21, 1936.                R. F. PEO                2,028,164
                        HYDRAULIC SHOCK ABSORBER
                          Filed July 10, 1933           3 Sheets-Sheet 2
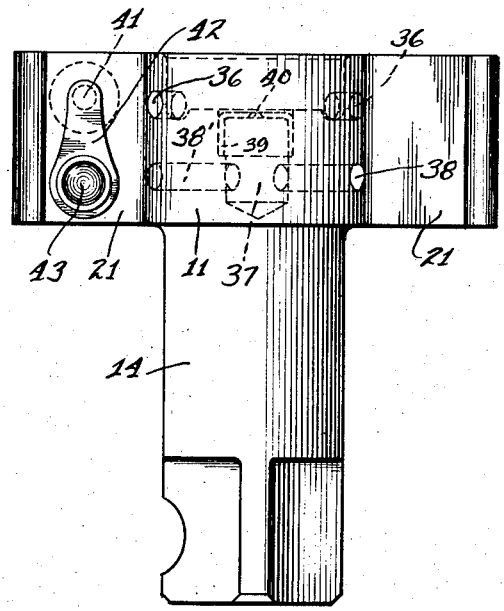
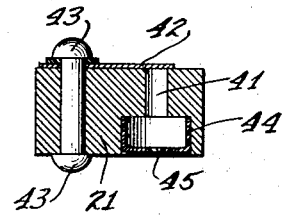
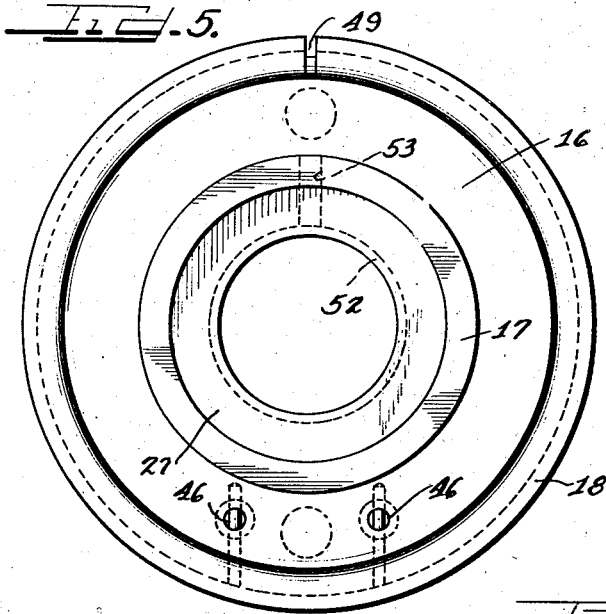
Inventor
Ralph F. Peo.
by Charles D. Wills Attys.

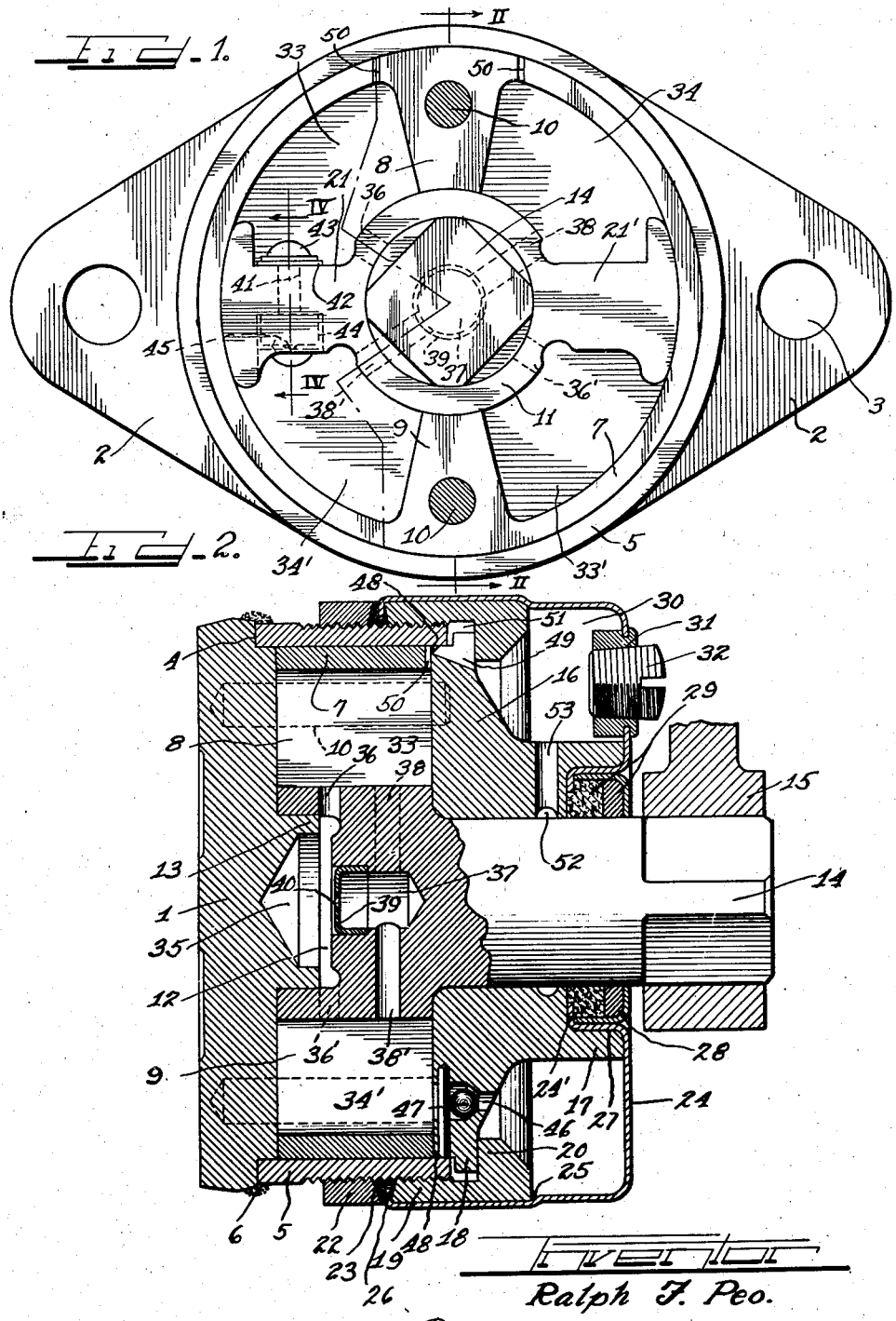

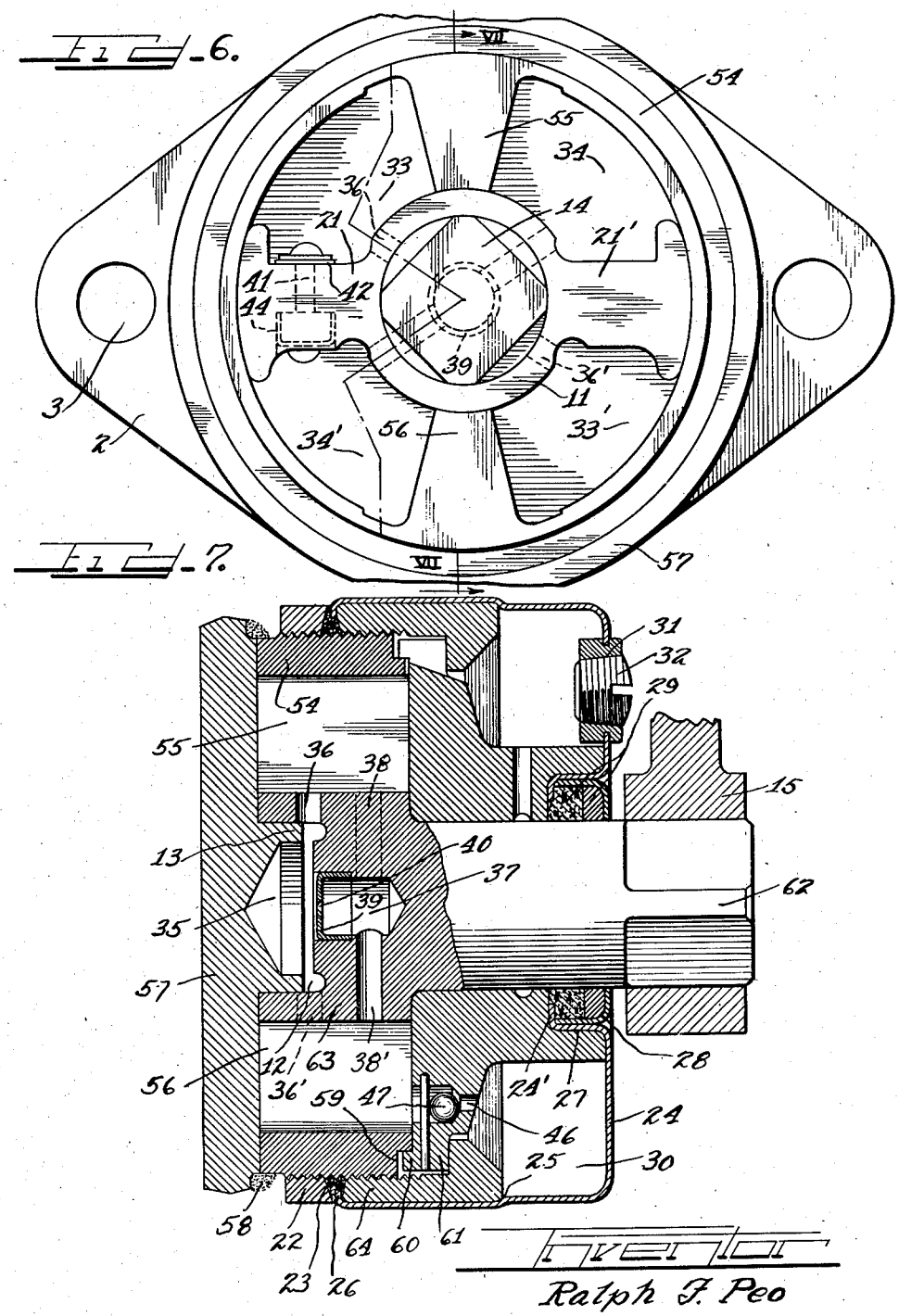

Patented Jan. 21, 1936

2,028,164

UNITED STATES PATENT OFFICE 2,028,164

HYDRAULIC SHOCK ABSORBER

Ralph F. Peo, Buffalo, N. Y., assignor to Houde Engineering Corporation, Buffalo, N. Y., a corporation of New York Application July 10, 1933, Serial No. 679,665

15 Claims. (Cl. 188—89)

My invention relates to hydraulic shock absorbers for automotive vehicles, particularly to the so-called "Houdaille" type of shock absorber.

The general object of the invention is to provide construction and arrangement which will eliminate internal threading heretofore provided in the main housing of the shock absorber for securing the outer removable wall of the hydraulic working chamber or for receiving an internal nut for engaging with and securing such wall. With such internal threading arrangement the peripheral or cylindrical wall of the housing had a tendency to bulge, spread, or otherwise give, thus permitting leakage and destroying the accuracy and precision of the structure.

A further object is to provide construction, arrangement and assembly which will increase the strength while reducing the weight and which will materially reduce the cost of manufacture.

The various features of my invention are incorporated in the structure disclosed on the accompanying drawings, in which drawings—

Figure 1 is a plan view of a shock absorber with parts broken away to reveal the interior arrangement;

Figure 2 is a section on plane II—II of Figure 1;

Figure 3 is a plan view of the piston structure;

Figure 4 is a section on plane IV—IV of Figure 1;

Figure 5 is an end view showing the construction of the outer end wall for the working chamber;

Figure 6 is a view similar to Figure 1, showing a modified arrangement; and

Figure 7 is a section on plane VII—VII of Figure 6.

The structure comprises a circular base 1 in the form of a metal plate which may be cast but which is preferably a steel forging and has laterally extending wings 2 provided with bolt holes 3 whereby the base may be secured to a support, such as the chassis side beams of an automotive vehicle. The base has the annular seat or step 4 for receiving the end of a length of steel tubing 5 and this tubing is securely welded to the base as indicated at 6 to form a strong sealed joint. In the arrangement of Figures 1 to 5, the tube length 5 forms the outer cylindrical wall which defines the hydraulic working space for the shock absorber.

Within and in intimate engagement with the wall 5 is the ring 7 shown as having upper and lower partition lugs 8 and 9 extending radially therefrom, these lugs being preferably formed integral with the ring and the entire structure being rigidly secured to the base 1 against rotation by means of pins 10 extending through the partition lugs and into the base plate 1.

Within the ring 7 and concentric therewith and with the base plate 1 is the cylindrical piston hub 11 which engages with and has bearing engagement with the inner faces of the partition lugs as clearly shown in Figure 1. At its inner end the hub has the cylindrical pocket 12 which receives the centering lug 13 extending from the base plate 1. A cylindrical shaft 14 extends outwardly from the hub for engagement by a lever 15 which is connected with, usually the axle, of the automotive vehicle in a manner well known in the art.

The outer or closure wall 16 with its bearing extension 17 journals the shaft 14, its inner face engaging against the ring 7 and partition lugs 8 and 9 so as to lock these parts against axial displacement. The wall 16 enters the tubular wall 5 a distance and has the peripheral flange 18 overhanging the outer edge of the wall 5. A thrust nut 19 has threaded engagement with the exterior threaded side of the tubular wall 5 and has the abutment flange 20 engaging against the outer side of the wall 16 to securely clamp this wall in closing position, this wall, together with the base plate 1 and the ring 7, defining the hydraulic working space in which operate the piston vanes 21 and 21' extending radially in opposite directions on the piston hub 11 with their outer surfaces fitting against the inner face of the ring 7. After setting and securing of the wall 16 it is locked against displacement by the annular lock ring or nut 22 engaging the threads on the tubular wall 5, a suitable gasket 23, which may be of rubber, being interposed so as to seal against leakage of hydraulic fluid.

A cup-shaped shell 24 in the form of a comparatively thin sheet metal stamping intimately slips over and around the thrust nut 19, the end of the cup receiving the nut being of slightly increased diameter in order to leave the annular abutment shoulder 25 for engaging against the outer edge of the nut, the inner end 26 of the shell being spun or rolled to engage around the inner edge of the nut. This rolling-over process is done while the lock ring 22 is displaced from the thrust nut and then the sealing gasket is applied and the lock nut tightened so that the gasket will serve also to seal against escape of any fluid which may work its way between the shell and the nut 19.

The outer wall of the shell 24 is perforated to receive the piston shaft 14 and is deflected into the recess 27 formed in the outer end of the bearing extension 17 to rest against the cylindrical side thereof, and it is engaged by the packing gland 28 in the form of a sheet metal cylindrical cup which has friction fit in the deflected part of the shell, the edge of the cup bearing against the radially deflected end 24' of the deflected part of the shell to hold it against the bottom of the recess 27. The shell 24 is thus securely anchored to the wall structure 16 while the deflected end 26 of the shell securely anchors the shell to the nut 19. The gland 28 encloses and compresses suitable packing material 29 against the shaft 14 and against the inner part of the gland 28 and the deflected end 24' of the shell 24 so that leakage of fluid to the exterior of the shock absorber along the shaft or between the deflected shell part and the gland is prevented.

The shell 24 forms with the wall 16 a replenishing chamber 30 for replenishing the hydraulic working chamber with fluid, the shell having at its upper end a filling opening 31 adapted to be closed by a plug 32.

The ring 7 with its partition lugs, and the piston structure, divides the hydraulic working space into high pressure chambers 33, 33' and low pressure chambers 34 and 34' in which the hydraulic fluid is displaced during oscillatory movement of the piston structure. A space 35 is provided between the centering lug 13 on the base plate 1 and the piston hub and this space is connected with the high pressure chambers 33 and 33' by ports 36 and 36' respectively, so that the high pressure chambers are always in communication with each other. Extending axially in the piston hub from the space 35 is the metering chamber 37 which at its outer end is connected by ports 38 and 38' with the low pressure chambers 34 and 34' respectively so that these chambers are always in communication. Seated in the inner end of the chamber 37 to be interposed between the space 35 and the ports 38 and 38' is the metering element 39 shown in the form of a sheet metal cup having friction fit in the bore or chamber 37 and in its transverse wall having the metering orifice 40 of the knife-edge type for introducing the desired resistance to the flow of hydraulic fluid from the high pressure chambers to the low pressure chambers with the flow practically uninfluenced by variations in temperature or viscosity of the fluid. This metering orifice forms the sole outlet for the flow of fluid from the high pressure chambers to the low pressure chambers during the rebound stroke of the shock absorber during travel of the vehicle.

To properly decrease the resistance flow during the bump strokes of the shock absorber the passage 41 is provided in one of the piston vanes. This passage is shown provided in the vane 21 and the end of the passage, which is exposed to the high pressure chamber 33, is controlled by a valve 42 shown in the form of a spring plate secured at one end as by a rivet 43, with its free end overlying the end of the passageway. During high pressure or rebound strokes of the shock absorber the pressure will hold the valve closed but during the bump strokes the pressure of the fluid from the low pressure chambers will open the valve to expose the passageway 41 so that fluid may flow from the low pressure to the high pressure chambers through this passageway in addition to the flow through the orifice 40. An orifice fitting 44 may be interposed in the passageway 41 and provided with a knife-edge orifice 45 calibrated for the desired relief flow uninfluenced by temperature changes.

The lower working chambers 33' and 34' are each connected with the replenishing chamber 30 through a passageway 46 controlled by a check valve 47. The inner peripheral corner of the wall 16 is chamfered in order to leave an annular recuperating channel or space 48 for receiving any fluid which might be forced out from the working chambers, this fluid flowing back to the replenishing chamber through a slot 49 in the upper edge of the wall 16. Adjacent to the upper partition lug 8 the ring 7 has notches 50 cut in its outer edge which communicate with the recuperating channel 48 so that any gas or air collected at the upper parts of the upper working chambers may escape to the replenishing chamber. The flange 18 on the wall 30 is displaced a small distance from the thrust nut 19 and the outer end of the tubular wall 5 to form another annular channel 51 in which any leakage oil may accumulate and be returned to the replenishing chamber by way of the slot 49. The annular groove 52 in the bearing extension 17 surrounds the shaft and connects with the replenishing chamber through a duct 53 so that any fluid escaping along the shaft will be intercepted and returned to the replenishing chamber.

Figures 6 and 7 show a modified arrangement. Instead of providing a separate ring with partition lugs thereon as in Figures 1 and 2 I make the cylindrical or tubular wall 54 of heavier construction with the partition lugs 55 and 56 forming an integral part thereof, this wall 54 being centered on the base plate 57 and securely welded thereto as indicated at 58. This arrangement eliminates the need of dowel pins as in the arrangement of Figures 1 and 2 and therefore reduces the cost of manufacture.

The wall 54 has the annular recess or step 59 for receiving the peripheral flange 60 on the outer closure wall 61 which journals the shaft 62 of the piston structure 63, the wall 61 being securely held in position by the thrust nut 64. In other respects the structures on Figures 6 and 7, and the operation, are the same as the structures in Figures 1 and 2.

The elimination of internal threading for securing the outer or shaft bearing wall permits the use of lighter and stronger steel parts and a material reduction in the total weight of the shock absorber structure. The steel tubular wall can be accurately and inexpensively joined and practically fused to the shock absorber base to form a strong unyielding and leak-proof structure. The thrust nut and the lock nut threading along the exterior of the tubular wall add their strength to the wall to prevent bulging or give and, since the closure wall 16 is made sufficiently heavy and strong, it will be accurately held rigidly in place by the thrust nut alone and the steel shell supported by the thrust nut and closure wall will not be required to do any supporting work and can be made of thin sheet metal of just sufficient strength to form the replenishing chamber, the engagement of the ends of the shell by the sealing gasket and gland preventing any leakage from the replenishing chamber.

A further advantage of my improved construction is that after the closure wall has been secured by the thrust nut the structure can be readily tested to note that proper rotation of the piston structure is assured without friction and that the valve action is proper. After such testing, the replenishing chamber shell is applied and secured.

It is evident that instead of the fluid flow controlling valve mechanism shown and described, other types of valve mechanism may be utilized.

I have shown practical embodiments of the various features of my invention, but I do not desire to be limited to the exact construction, arrangement and operation shown and described as changes and modifications may be made without departing from the scope of the invention as defined in the appended claims.

I claim as follows:

1. In a hydraulic shock absorber, the combination of inner and outer circular end walls, an intermediate cylindrical wall secured to said inner end wall, said walls defining a cylindrical hydraulic working chamber, an annular thrust nut having threaded engagement with the outside of said intermediate wall and having an abutment flange abutting the outer side of said outer end wall for locking said walls together, a piston operable within said chamber, a sheet metal cup intimately receiving and surrounding said thrust nut and forming with said outer end wall and said nut a fluid reservoir for replenishing said working chamber, the end of said cup being deflected around the inner end of said nut, an annular locking nut threading on said intermediate wall, and packing material clamped between said nut and against the deflected end of said cup.

2. In a hydraulic shock absorber, the combination of inner and outer end walls, an intermediate cylindrical wall structure secured at one end to said inner end wall, an annular thrust nut having threaded engagement with the exterior of said intermediate wall structure and abutting said outer end wall structure to secure it to the intermediate wall structure, said walls defining a hydraulic working chamber, a piston operable within said chamber, said outer end wall having an extension, a shaft on said piston structure journaled in said outer end wall and said extension, and a sheet metal cup slipped over said nut and deflected to engage around the inner edge thereof, the base of said cup being clamped against the outer end of said bearing extension, said cup forming a fluid replenishing chamber.

3. In a hydraulic shock absorber, the combination of an outer end wall and an inner end wall, an intermediate cylindrical wall structure secured to the inner end wall, an annular thrust nut having threaded engagement with the exterior of said intermediate wall structure and abutting said outer wall structure to secure it to the intermediate wall structure, said walls defining a hydraulic working chamber, said outer end wall having a bearing extension, a shaft extending from said piston structure and journaled in said bearing extension, a sheet metal cup slipped over and intimately surrounding said nut and having its edge deflected around the inner end of said nut, an annular lock nut having threaded engagement on the exterior of said intermediate wall structure, a gasket held by said lock nut against the inner end of said nut and the deflected end of said cup, the base of said cup surrounding said shaft, and means clamping said base to the outer end of said bearing extension.

4. In a hydraulic shock absorber, the combination of an inner end wall and an outer end wall, an intermediate annular wall extending from said inner end wall, said annular wall having exterior threading, partition members extending radially between said end walls and said annular wall, an annular thrust nut having threaded engagement with said annular wall and having an abutment flange abutting the outer side of said outer end wall for clamping said wall against said partition members, said walls defining a hydraulic working space, a piston operable in said space between said partition members, an operating shaft extending from said piston structure, said outer end wall having a bearing extension and said wall and extension journaling said shaft, a packing recess in the outer end of said extension surrounding said shaft, a cup-shaped sheet metal shell receiving and intimately surrounding said thrust nut and having an opening in its transverse wall receiving the shaft, the shell material around said opening being deflected into said packing recess, and a packing gland pressed in said recess between said shaft and said shell deflection.

5. In a hydraulic shock absorber, the combination of an inner end wall and an outer end wall, an intermediate annular wall extending from said inner end wall, said intermediate wall having exterior threading, partition members extending radially between said end walls and said intermediate wall, an annular thrust nut having threaded engagement with said intermediate wall and having an abutment flange abutting the outer side of said outer end wall for clamping said wall against said partition members, said walls defining a hydraulic working space, a piston operable in said space between said partition members, an operating shaft extending from said piston structure, said outer end wall forming a bearing for said shaft and having an annular recess in its outer end surrounding said shaft, a sheet metal cup having an opening in its base to clear said shaft and the metal around said opening being deflected to extend into said recess, a packing gland secured in said recess for holding the deflected cup end therein, the open end of said cup receiving and intimately surrounding said thrust nut and the outer edge of the cup being deflected around the inner edge of said nut, said cup with said outer end wall and nut enclosing a replenishing chamber for hydraulic fluid, and connections between said chamber and said working space.

6. In a hydraulic shock absorber, the combination with an outer end wall and an inner end wall, an intermediate cylindrical wall structure secured at one end to said inner end wall, a thrust nut having threaded engagement with the exterior of said cylindrical wall structure and abutting said outer wall structure to secure it to the cylindrical wall structure, said walls defining a cylindrical working chamber, a piston operable in said chamber, said outer end wall having a bearing extension and a shaft for said piston structure journaled in said outer end wall and said bearing extension, said bearing extension having a recess, and a sheet metal shell secured at its inner end to said nut and at its outer end in said recess and forming a replenishing chamber.

7. In a hydraulic shock absorber, the combination of outer and inner end walls, an intermediate annular wall structure secured to the inner end wall, a clamping nut having threaded engagement with said intermediate wall and securing said outer wall thereto, said walls defining a hydraulic working chamber, said outer end wall having a bearing extension, a piston operable within said working chamber and having a shaft extending therefrom and journaled in said bearing extension, a sheet metal replenishing chamber forming cup, means securing the inner end of said cup to said clamping nut, and means securing the outer end of said cup to said bearing extension.

8. In a hydraulic shock absorber, a housing structure defining a hydraulic working chamber, a piston structure operable in said working chamber, said housing having a bearing extension projecting beyond one end thereof, a shaft extending from said piston structure and journaled in said bearing extension, a cup structure, and means securing the base of said cup structure to the outer end of said bearing extension, the open end of said cup structure intimately receiving the adjacent end of said housing structure, said housing structure having a circumferential annular shoulder and the rim of said cup structure being deflected around said shoulder to thereby anchor said cup structure to said housing structure, said cup structure together with the adjacent end of said housing structure and said bearing extension defining a fluid reservoir.

9. In a hydraulic shock absorber, a housing structure defining a hydraulic working chamber, a piston structure operable in said working chamber, a bearing flange extending from one end of said housing structure, a shaft extending from said piston structure and journaled in said bearing extension, a sheet metal cup structure having an opening in its base through which said shaft extends, the open end of said cup structure intimately receiving the adjacent end of said housing structure, said bearing extension having a packing recess in its outer end surrounding said shaft, the material of the cup around said base opening being deflected into said recess, a packing gland in said recess engaging the deflected part of the cup base to thereby anchor said base to the end of said bearing extension, and packing material held in said recess by said gland, said cup together with the adjacent end of said housing structure and said bearing extension defining a fluid reservoir.

10. In a hydraulic shock absorber, a housing structure defining a hydraulic working chamber, a piston structure operable in said working chamber, a bearing flange extending from one end of said housing structure, a shaft extending from said piston structure and journaled in said bearing flange, a sheet metal cup having an opening in its base through which said shaft extends, the open end of said cup intimately receiving the adjacent end of said housing structure, said bearing flange having a packing recess in its outer end surrounding said shaft, the cup material around the base opening being deflected to seat against the circumferential side and against the bottom of said recess, a packing gland in said recess pressing against the deflected part of the cup base to thereby anchor the cup base to the bearing flange end, and packing material held in said recess by said gland, said cup together with the adjacent end of said housing structure and said bearing flange defining a fluid reservoir.

11. In a hydraulic shock absorber, a housing body enclosing a hydraulic working chamber, a piston structure operable in said chamber, a bearing extension on one end of said housing body and a piston shaft journaled in said extension, said bearing extension having an annular recess in its outer end, a sheet metal cup having an opening in its base for said shaft and an inwardly extending flange around said opening, said flange engaging in said annular recess whereby said cup base is anchored to the bearing extension end, the open end of said cup intimately receiving the adjacent end of said housing body, said cup together with the adjacent end of said housing body and said bearing extension defining a fluid reservoir.

12. In a hydraulic shock absorber, a housing body enclosing a hydraulic working chamber, a piston structure operable in said chamber, a bearing extension on one end of said housing body and a piston shaft journalled in said extension, said bearing extension having an annular recess in its outer end, a sheet metal cup having an opening in its base for said shaft and an inwardly extending flange around said opening, said flange engaging in said annular recess whereby said cup base is anchored to the bearing extension end, the open end of said cup intimately receiving the adjacent end of said housing body, and an annular shoulder on said housing body around which the rim of the cup is deflected to be thereby anchored to the housing body, said cup together with the adjacent end of said housing body and said bearing extension defining a fluid reservoir.

13. In a hydraulic shock absorber, a housing body enclosing a hydraulic working chamber, a piston structure operable in said chamber, a bearing extension on one end of said housing body and a piston shaft journaled in said extension, said bearing extension having an annular recess in its outer end, a sheet metal cup having an opening in its base for said shaft and a flange extending around said opening, a packing in said recess between said cup flange and said shaft, the open end of said cup intimately receiving the adjacent end of said housing body, said housing body having an annular external groove and the end of said cup being deflected into said groove whereby said cup is anchored to the housing body.

14. In a hydraulic shock absorber, a housing body enclosing a hydraulic working chamber, a piston structure operable in said chamber, a bearing extension on one end of said housing body and a piston shaft journaled in said extension, said bearing extension having an annular recess in its outer end, a sheet metal cup having an opening in its base for said shaft and a flange extending around said opening, a packing in said recess between said cup flange and said shaft, the outer portion of said cup being of increased diameter to provide an annular internal shoulder intermediate the cup base and rim, said increased diameter portion intimately receiving the adjacent end of said housing body with said annular shoulder abutting the housing body end and said body having an annular recess into which the rim end of the cup is deflected whereby said cup is anchored to the housing body.

15. In a hydraulic shock absorber, a housing body enclosing a hydraulic working chamber, a piston structure operable in said chamber, a bearing extension on one end of said housing body and a piston shaft journaled in said extension, a sheet metal cup having an opening in its base for said shaft and a flange extending around said opening, said flange having interlocking engagement with the end of said extension, the open end of said cup intimately receiving the adjacent end of said housing body, said housing body having an annular shoulder and the end of said cup being deflected around said shoulder whereby said cup is anchored to said housing body.

RALPH F. PEO.